March 23, 1937.                E. F. PAWSAT                2,074,422
SUPPORT FOR BICYCLES
Filed June 26, 1935
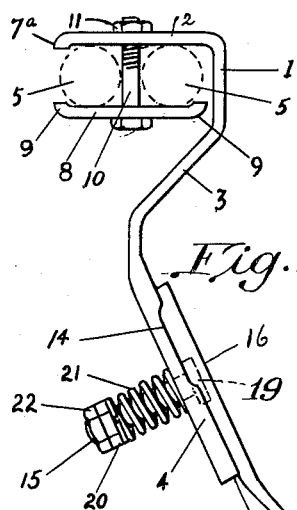
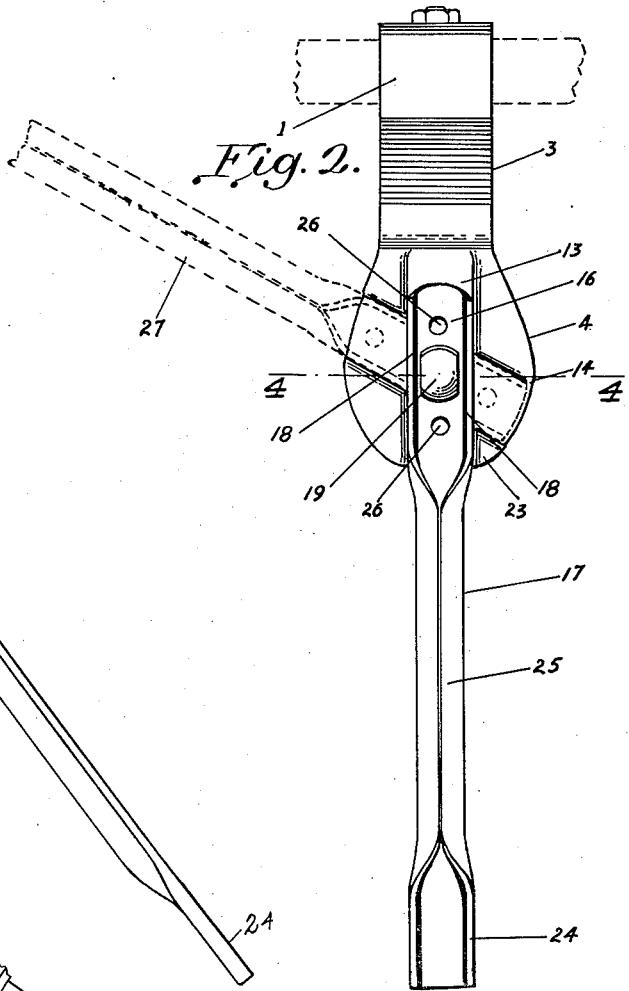
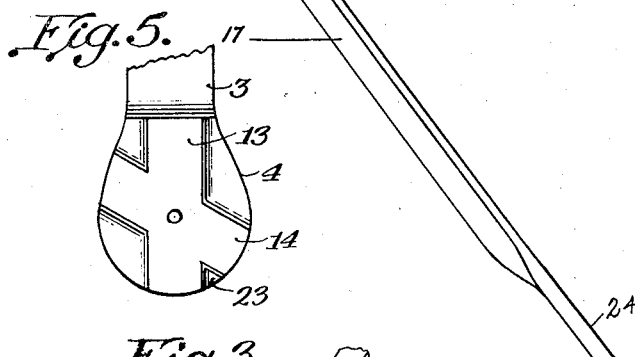
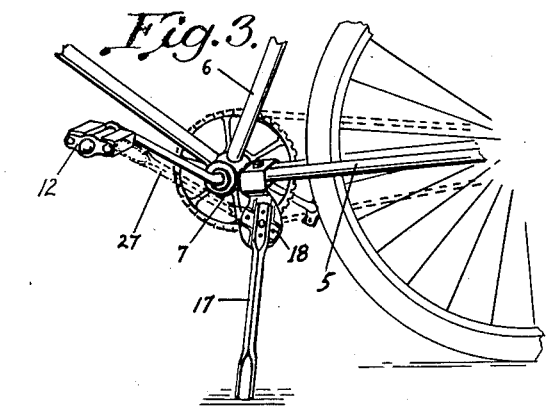
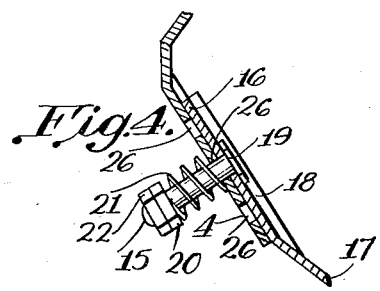
Inventor,
Ewald F. Pawsat.
By Arthur H. Ewald,
Attorney.

Patented Mar. 23, 1937

2,074,422

UNITED STATES PATENT OFFICE 2,074,422

SUPPORT FOR BICYCLES

Ewald F. Pawsat, Maysville, Ky., assignor to Wald Manufacturing Company, Incorporated, a corporation of Kentucky Application June 26, 1935, Serial No. 28,503

9 Claims. (Cl. 208—75)

My invention relates to supports or stands for bicycles.

The principal object of the present invention is to provide a simple and effective support or stand for sustaining a bicycle in an upright position when not in use.

A further object of the invention is to provide a support or stand of the type mentioned, which may be readily attached to or removed from a bicycle.

Another object of the invention is to provide a stand which is readily adjustable to bicycles of various sizes.

Further objects of the invention will appear from the following detailed description thereof.

In the drawing:

Figure 1 is a front elevation of a bicycle stand constructed in accordance with this invention.

Figure 2 is a side elevation of said stand.

Figure 3 is a perspective showing the stand secured to a bicycle.

Figure 4 is a sectional view on line 4—4 of Figure 2.

Figure 5 is a plan view of the supporting head.

The bicycle support as constructed in accordance with the present invention consists of a supporting bracket member 1 having an upper horizontal section 2, and a downwardly extending oblique section 3 terminating in a head 4 which turns outwardly. The section 2 of the bracket is adapted to fit over the horizontal frame members 5—5 of the bicycle frame 6 just in back of the pedal bearing hanger 7 as clearly shown in Figure 3 of the drawing. The free edge of the horizontal section 2 is turned downwardly to form a flange 7a conforming to the contour of the inner frame member 5. Adapted to cooperate with the horizontal section 2 of the bracket 1 is a clamping plate 8 the lateral edges of which are upturned as shown at 9—9 so as to conform to the sides of members 5—5 of the bicycle frame. The section 2 and plate 8 form complementary clamping members whereby the bracket may be secured to the bars 5—5 of the frame 1, and for this purpose said section and plate are perforated for a bolt 10 which is adapted to extend between the bars 5—5 as shown in Figure 1. By tightening the nut 11 on the bolt 10, it will be seen that the clamping members are adapted firmly to secure the bracket 1 in position on the frame, the lateral flanges 7a and 9—9 effectually preventing turning of the bracket on the frame.

The oblique section 3 of the bracket is turned inwardly so that the head 4 and attached elements will be so positioned that the pedal 12 of the bicycle will during rotation have ample clearance. The head 4 is provided with shallow channels 13 and 14 which intersect, the channel 13 being vertically disposed along the axis of the head and bracket, and the channel 14 intersecting channel 13 at an oblique angle for the purpose hereinafter mentioned. The channels at the central part of intersection are perforated to receive a bolt 15 which serves as a pivotal mounting for the head 16 of the supporting standard 17. The head 16 of the standard is provided with lateral flanges 18—18 between which the rectangular head 19 of the bolt 15 rests. Interposed between the rear side of the head 4 of the bracket and the nut 20 of bolt 15 is a compression spring 21 which holds the head 16 of the standard under compression against the head 4 of the bracket. A lock nut 22 prevents the nut 20 from loosening. The head 4 of the bracket is provided with a boss or detent 23 which is located at the lower end of the channel 13 adjacent the rear portion thereof.

The standard 17 is provided with a foot 24, and intermediate the head 16 and said foot is reenforced by doubling over the flanges as shown at 25.

The head 16 of the standard 17 is provided with a series of perforations 26, of which, as shown in the drawing, there are three; either of the perforations 26 is adapted to provide passage for the bolt 15, and thus the standard may be secured to the head through either of said perforations thus adjusting the effective height of the standard, which is that portion thereof below the perforation used in mounting. The head 16 of the standard is so proportioned in relation to the head 4 of the bracket, that the standard may be rotated around the bolt 15, no matter which of the perforations 26 is used without interference of the oblique section 3.

In order to secure my new support to a bicycle, the horizontal section 2 of the bracket 1 is placed over the frame members 5—5 and the complementary clamping member secured by means of the bolt 10. When thus positioned, the oblique section 3 sustains the head 4 and standard 17 in such relation to the pedal 12 that sufficient clearance is provided for the latter during its operation. When the support is in use, the standard 17 is rotated so as to cause the head 16 to rest in the channel 13 within which it is held under compression by means of the spring 21. When it is no longer desired to use the support, the standard 17 is rotated upwardly and forwardly, the head 16 riding out of the channel 13 against the compression of spring 21 until the standard has reached the position in which it is to remain when not in use, when the head snaps into the channel 14 where it is again held by means of the spring 21. The standard is thus supported in an oblique upward and forward position, as shown in broken lines at 27 in Figure 2. In such position it rests under the pedal bearing hanger 7 and inside the pedal crank, as clearly shown in Figure 3.

It will be noted furthermore that the support may be adapted to bicycles of various sizes by merely changing the mounting of the standard 17, this being done by using the appropriate perforation of the head 16 of said standard.

Having thus fully described my invention, what I claim as new and desire to secure by Letters Patent is:

1. A support for bicycles comprising a bracket having a horizontal section arranged to fit over a portion of the frame of said bicycle, a clamping plate arranged to cooperate with said horizontal section to secure said bracket, a head on the lower portion of said bracket, a standard, said standard being provided with a series of perforations in its upper end, means for pivotally securing said standard through either of said perforations to said head, and means for maintaining frictional pressure between said standard and head.

2. A support for bicycles comprising a bracket having a horizontal section arranged to fit over a portion of the frame of said bicycle, a clamping plate arranged to cooperate with said horizontal section to secure said bracket, a head on the lower portion of said bracket, said head being provided with intersecting channels, a standard, said standard being provided with a series of perforations in its upper end, means for pivotally securing said standard through either of said perforations to said head at the central point of intersection of said channels, and means for maintaining frictional pressure between said standard and said head.

3. A support for bicycles comprising a bracket having a horizontal section arranged to fit over a portion of the frame of said bicycle, a clamping plate arranged to cooperate with said horizontal section to secure said bracket, a head on the lower portion of said bracket, said head being provided with channels which intersect at an oblique angle, a standard, said standard being provided with a series of perforations in its upper end, means for pivotally securing said standard through either of said perforations to said head at the central point of intersection of said channels, and means for maintaining frictional pressure between said standard and head.

4. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section and a head at the end of said oblique section, said head being downwardly inclined at an oblique angle, a clamping plate arranged to cooperate with said horizontal section to secure said bracket, a standard, means for pivotally securing said standard in said head, and means for maintaining frictional pressure between said standard and head.

5. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section, and a head at the end of said oblique section, said head being downwardly inclined at an oblique angle, a clamping plate arranged to cooperate with said horizontal section to secure said bracket, said head being provided with intersecting channels, a standard, means for pivotally securing said standard to said head at the central point of intersection of said channels, and means for maintaining frictional pressure between said standard and head.

6. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section, and a head at the end of said oblique section, said head being downwardly inclined at an oblique angle, a clamping plate arranged to cooperate with said horizontal section to secure said bracket, said head being provided with channels which intersect at an oblique angle, a standard, means for pivotally securing said standard to said head at the central point of intersection of said channels, and means for maintaining frictional pressure between said standard and head.

7. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section and a head at the end of said oblique section, said head being downwardly inclined at an oblique angle, a clamping plate arranged to cooperate with said horizontal section to secure said bracket, a standard, said standard being provided with a series of perforations in its upper end, means for pivotally securing said standard through either of said perforations to said head, and means for maintaining frictional pressure between said standard and head.

8. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section and a head at the end of said oblique section, said head being downwardly inclined at an oblique angle, a clamping plate arranged to cooperate with said horizontal section to secure said bracket, said head being provided with intersection channels, a standard, said standard being provided with a series of perforations in its upper end, means for pivotally securing said standard through either of said perforations to said head at the central point of intersection of said channels, and means for maintaining frictional pressure between said standard and head.

9. A support for bicycles comprising a bracket, said bracket consisting of a horizontal clamping section arranged to fit over a portion of the frame of a bicycle, a vertical section arranged to extend downwardly at the side of said frame portion, an inwardly inclined oblique section below said vertical section and a head at the end of said oblique section, said head being downwardly inclined at an oblique angle, a clamping plate arranged to cooperate with said horizontal section to secure said bracket, said head being provided with channels which intersect at an oblique angle, a standard, said standard being provided with a series of perforations in its upper end, means for pivotally securing said standard through either of said perforations to said head at the central point of intersection of said channels, and means for maintaining frictional pressure between said standard and head.

EWALD F. PAWSAT.